United States Patent [19]

Fukuyama et al.

[11] Patent Number: 5,341,059
[45] Date of Patent: Aug. 23, 1994

[54] SUPERCONDUCTING BEARING UNIT AND OPERATING METHOD THEREOF

[75] Inventors: Hiromasa Fukuyama, Ebina; Satoru Aihara, Kawasaki; Masato Murakami, Tokyo; Hiroyuki Fujimoto, Tokyo; Akihiro Kondoh, Tokyo; Hiroshi Takaichi, Tokyo; Naoki Koshizuka, Tokyo, all of Japan

[73] Assignees: International Superconductivity Technology Center; Nippon Steel Corporation, both of Tokyo; Railway Technical Research Institute, Kokubunji; Kawasaki Jukogyo Kabushiki Kaisha, Kobe; Shikoku Electric Power Co., Inc., Takamatsu, all of Japan

[21] Appl. No.: 954,674

[22] Filed: Sep. 30, 1992

[30] Foreign Application Priority Data

Sep. 30, 1991 [JP] Japan ................ 3-276351

[51] Int. Cl.$^5$ ................................. H02K 7/09
[52] U.S. Cl. ................................ 310/90.5; 505/876
[58] Field of Search ........... 310/90.5; 505/1, 700, 505/727, 876

[56] References Cited

U.S. PATENT DOCUMENTS

| | | | |
|---|---|---|---|
| 4,926,082 | 5/1990 | Barnes | 310/90.5 |
| 4,956,571 | 9/1990 | Gordon et al. | 505/700 |
| 5,117,139 | 5/1992 | Flom et al. | 310/90.5 |
| 5,126,317 | 6/1992 | Agarwala | 505/1 |
| 5,130,588 | 7/1992 | Armstrong et al. | 310/90.5 |
| 5,159,219 | 10/1992 | Chu et al. | 505/876 |
| 5,196,748 | 5/1993 | Rigney | 310/90.5 |

FOREIGN PATENT DOCUMENTS

| | | | |
|---|---|---|---|
| 0322693 | 7/1989 | European Pat. Off. | 310/90.5 |
| 1049694 | 10/1983 | U.S.S.R. | 310/90.5 |
| 9214271 | 9/1992 | World Int. Prop. O. | 310/90.5 |

OTHER PUBLICATIONS

"Modern Physics Letter B", World Scientific, vol. 6, 1992.
"Characterization of High-Temperature Superconducting Bearing", Yotsuya et al. 36A Advances in Cryogenic Engineering, N.Y., 1992.
"Magnetic Levitation Using YBaCuO Superconductors Fabricated by the MPMG Process" by Marakami et al, 1991.
"Lecture Summary of the 1991 Spring Cryogenic Engineering and Superconducting Symposium".

*Primary Examiner*—R. Skudy
*Assistant Examiner*—Matthew Nguyen
*Attorney, Agent, or Firm*—Helfgott & Karas

[57] ABSTRACT

A superconducting bearing unit compring a permanent magnet mounted to a rotating shaft and a superconducting body mounted on the inner periphery of a housing surrounding the shaft, the superconducting member being adapted to be cooled with the rotating shaft moved upwards until it attains a superconducting condition, so that the rotating shaft is supported in use in a balanced condition between the weight of the rotating shaft, etc. and a pinning force caused by the permanent magnet and the superconducting member.

4 Claims, 7 Drawing Sheets

SUPERCONDUCTING BEARING UNIT AND OPERATING METHOD THEREOF

INDUSTRIAL FIELD OF THE INVENTION

The present invention is related to a superconducting bearing unit and an operating method thereof which may be used for rotational support in devices such as high speed centrifugal separators, flywheels for storing energy, and super high vacuum turbo molecular pumps.

BACKGROUND OF THE INVENTION

Up until now, in order to obtain super high vacuums in various experimental apparatus and manufacturing equipment, a turbo molecular pump such as shown in FIG. 11 has been used.

The turbo molecular pump comprises a cylindrical housing 1, a rotating shaft 2 supported inside the cylindrical housing 1, a motor 3 for rotating the rotating shaft 2, a rotor 4 supported on the rotating shaft 2, a plurality of vanes 5 provided on the upper end periphery of the rotor 4, a cylindrical casing 7 enclosing the periphery of the housing 1 and having a suction port 6 at one end thereof, a plurality of stator blades 9 supported on an inner peripheral face of the casing 7 which together with the rotor vanes 5 make up a pump 8, and a discharge port 10 for discharging the air drawn in through the suction port 6 by means of the pump 8.

An upper magnetic ring 11 and lower magnetic ring 12 are fixedly fitted at respective upper and lower locations on the outer peripheral surface of the rotating shaft 2. An upper radial electromagnet 13 is provided on an inner periphery of the upper portion of the housing 1 in a position opposite the upper magnetic ring 11, thereby making up the upper radial magnetic bearing 14. Furthermore, a lower radial electromagnet 15 is provided on an inner periphery of the lower portion of the housing 1 in a position opposite the lower magnetic ring 12, thereby making up the lower radial magnetic bearing 16.

Furthermore, a flange 20 of a magnetic material is provided on a central outer periphery of the rotating shaft 2, and a pair of upper and lower thrust electromagnets 21 are supportingly fixed to an inner face of the housing 1 and opposing the magnetic flange 20, thereby forming a thrust magnet bearing 22.

The position of the rotating shaft in a radial direction is detected by upper and lower radial sensors 17 and 18 provided at respective upper and lower positions on the inner face of the housing 1. Similarly, the position of the rotating shaft 2 in the thrust direction is detected by a thrust sensor 19 provided between a lower end face of the rotating shaft 2 and the bottom face of the housing 1.

Signal indicating the detected values from the respective sensors 17 to 19 are input to a controller (not shown in the figure) which controls the power to the electromagnets 13, 15 and 21 based on the signals from the respective sensors 17 to 19 so as to maintain the rotating shaft 2 in a floating condition. As a result, the rotating shaft 2 is able to rotate at super high speed without any contact of parts.

In operating the conventional turbo molecular pump constructed above, the rotating shaft is maintained in a floating condition by means of signals from the controller, and the motor 3 is switched on. The rotating shaft 2 and the rotor 4 then rotate up to high speed, depending on the power supplied to the motor 3, and air sucked in from the inlet port 6 by the pump 8 comprising drive vanes 5 and stator blades 9, is discharged from the discharge port 10, so that components connected to the suction port 6 can be held at a super high vacuum condition.

Touch-down bearings 23 are provided for preventing severe rubbing between members rotating with the rotating shaft 2 and the members fixed to the housing 1 when the power to the respective electromagnets 13, 15, 21 is stopped at the time of power cuts etc. In addition, a connector is provided for supplying power to the respective electromagnets 13, 15, 21 and for outputting the detected signals from the respective sensors 17 to 19.

With the conventional turbo molecular pump constructed and operated as above, since controllable type magnetic bearings 14, 16, 22 are used to support the rotating shaft 2 in a floating condition, it is difficult to avoid high manufacturing costs due to the complicated nature of the construction.

With this construction, since the floating condition of the rotating shaft 2 is maintained by control of the power to the electromagnets 13, 15, 21, then precise sensors having very high response characteristics are required for the sensors 17 to 19. Furthermore, the controller for controlling the power to the respective electromagnets 13, 15, 21, based on the signals from the respective sensors 17 to 19, must also have exceptionally high response characteristics. As a consequence manufacturing costs are increased.

To deal with this problem, a bearing unit is developed in which a rotating shaft with a permanent magnet supportingly fixed thereto is maintained in a floating condition by utilizing the repulsive force between a superconducting body and permanent magnet based on the Meissner effect. Research with this so-called superconducting bearing unit is progressing, however the force for floating the rotating shaft is small, so that it is not possible to support a heavily loaded rotating shaft.

This is because the threshold of the magnetic field wherein the Meissner effect occurs is extremely smaLL. For example, when using $YBa_2Cu_3O_7$ for the super conducting body, this has a magnetic intensity of around 200 Oersted when cooled in liquid nitrogen (77 degrees K). Consequently, when the rotating shaft is floated by means of the Meissner effect, the weight of the rotating shaft can be no more than 1 Kg for a practical size of superconducting bearing unit.

On the other hand, with recent research (see, for example, "Cryogenics Engineering Journal" Vol.26. 1991, Chapter 26 page 70), success had been achieved with superconducting materials of YBaCuO compounds in inducing a pinning point (the point existing in superconducting materials at which a pinning force occurs). The pinning force occurs as a result of a screening or shielding current flowing within the superconducting body, which acts to restrict those magnetic flux of force generated by the permanent magnet that penetrate into the superconducting body. The pinning force acts in a direction to prevent a change in distance between the superconducting body and the permanent magnet when this distance is changed. That is to say, a repulsive force acts between the superconducting body and the permanent magnet when the superconducting body tends to approach the permanent magnet, and an attractive force acts between the superconducting body and the permanent magnet when the superconducting body tends to separate from the permanent magnet.

The repulsive force attributable to the pinning force as described above, is much larger than the repulsive force due to the Meissner effect, and by appropriate selection of the permanent magnet, a force of approximately 10 N/cm$^2$ can be obtained. Furthermore, there is a new operating force in the form of an attractive force attributable to a pinning effect which has not occurred in superconducting bodies used heretofore. With this force, as with the above-mentioned repulsive force, a force of approximately 10 N/cm$^2$ can be obtained by suitable selection of the permanent magnet. Accordingly, if a superconducting bearing unit is made utilizing this pinning force, a rotating shaft of a practical size and built-up weight can be supported.

It should be noted that although superconducting bearing units conventionally proposed have been constructed so that the rotating shaft is floated by utilizing the repulsive force due to the Meissner effect, constructions wherein the rotating shaft is supported by a working force attributable to the pinning force (attractive force and repulsive force) do not exist in the prior art.

SUMMARY OF THE INVENTION

An object of the present invention, is to provide a superconducting bearing unit for supporting a rotating shaft of practical size and built-up weight by utilizing the working force attributable to the pinning force occurring in a superconducting body.

Another object of the present invention is to provide a super conducting bearing unit which comprises a shaft and bearing combination having at least one superconducting bearing section wherein at least one bearing of superconducting body or magnet is coactive with magnets or superconducting bodies provided on the shaft. The feature of the bearing unit is that the force generated in the superconducting bearing section(s) includes an at tractive force.

Furthermore, another object of the present invention is to provide a method of operation of the superconducting bearing unit, wherein a predetermined positional relationship is maintained between a superconducting body in a non-superconducting state and a magnet, and then the superconducting body is cooled until it attains a superconducting condition. Then by appropriately changing the positional relationship between the superconducting body and the magnet, at least an attractive force out of attractive and repulsive forces attributable to a pinning force is generated between the superconducting body and magnet.

DESCRIPTION OF THE PREFERRED EMBODIMENTS

Figure 1A:
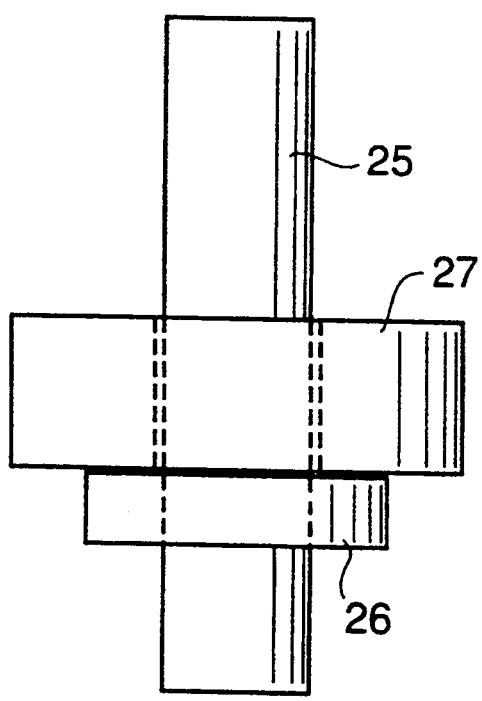
FIGS. 1(A) and 1(B) are schematic side views showing a first embodiment of the present invention, respectively, in the set up condition and operational condition.

FIGS. 1(A) and (B) show a first embodiments of the present invention. A rotating shaft 25 fitted inside a housing (not shown in the figure) so as to rotate freely is vertically extending. A superconducting bearing section is made up by fixedly attaching an annular or a cylindrical permanent magnet 26 to the outer periphery of the rotating shaft 25, and fixedly supporting an annular or a cylindrical superconducting body 27 on an inner peripheral face of the housing. The permanent magnet 26 and the superconducting body 27 are relatively movable to and from each other. Furthermore, a cooling agent jacket (not shown in the figure) to enable the free flow of cooling agent such as liquid nitrogen is provided inside the housing at a portion in contact with the superconducting body 27.

With the superconducting bearing unit of the present invention constructed as above, the rotating shaft 25 is maintained in a floating condition through the following steps; at first before the superconducting body 27 becomes superconducting, that is before cooling agent is supplied to the cooling jacket, the rotating shaft 25 is raised as shown FIG. 1(A) with the upper face of the permanent magnet 26 in contact with the lower face of the superconducting body 27.

Figure 1B:
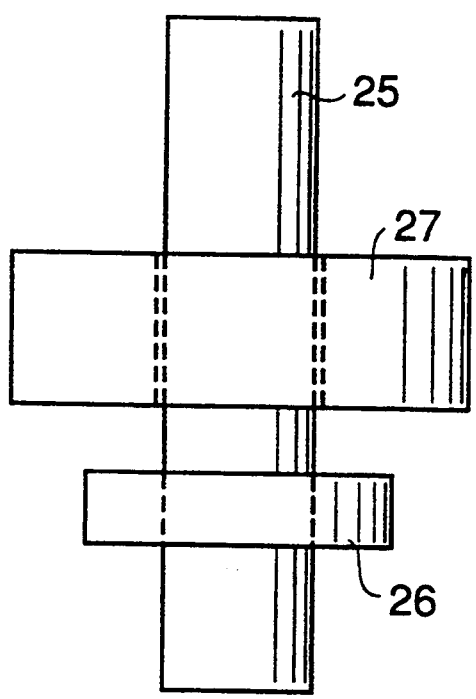

Then in this condition, cooling agent is supplied to the cooling jacket so that the superconducting body 27 becomes superconducting. The force holding up the rotating shaft 25 is then removed, and as shown FIG. 1(B), the rotating shaft 25 and the permanent magnet 26 fixed to the rotating shaft 25 tend to fall under their own weight so that the distance between the permanent magnet 26 and the superconducting body 27 tends to increase.

As a result, an attractive force attributable to the pinning force acts between the permanent magnet 26 and the superconducting body 27 so as to cause the positional relationship between the respective bodies 26 and 27 to return to the original condition (the condition before removing the force holding up the rotating body 25). Since the space between the permanent magnet 26 and the superconducting body 27 can be maintained in a balanced condition between the attractive force and the weight of the rotating shaft 25 and the permanent magnet 26. Then if the magnitude of the attractive force and the weight of rotating shaft 25 etc. is appropriately determined, the rotating shaft 25 can be maintained in a floating condition.

With the first embodiment, the rotating shaft 25 is described as rotating inside the housing. However, it is possible for a member such as the rotor to have the superconducting body 27 mounted thereon and to rotate around a fixed axle. In this case, in order to cool the superconducting body 27 provided on the rotating member, it may be possible to cool the whole unit by means of a multi stage refrigerator.

Furthermore, for example when the bearing units are used in space, it may not be necessary to provide a cooling means. In this situation, instead of a cooling means, a heating means may be provided, and the positional relationship between the rotating shaft 25 and the superconducting body 27 is controlled with the superconducting body 27 heated by the heating means. Subsequently, the function of the heating means may be stopped. Then, since the temperature in space is low, when the heating means is stopped, the superconducting body 27 becomes superconducting, so that the member such as the rotating shaft 25 or rotor etc. is maintained in a floating condition. However, if before launching a manmade satellite containing such bearing units, the positional relationship between the rotating shaft 25 and the superconducting body 27 is controlled on the ground, and provision is made for removing this control in the cold space environment, then the heating means becomes unnecessary.

In addition, when the bearing unit is used in non-gravity space, different from the condition when used on the ground where gravity has an effect, the positional relationship between the rotating shaft 25 and the superconducting body 27 must be controlled to a positional relationship corresponding to or close to the positional relationship where the bearing is actually used for rotation. In this case, the positional relationship is controlled to be displaced slightly from the rotating condition in use, and once the superconducting body 27 becomes superconducting, the rotating condition in use is achieved by slightly moving the positional relationship between the permanent magnet 26 and the superconducting body 27. Consequently, the repulsive and attractive forces acting between the pair of members 26 and 27 attributable to the pinning force becomes large so that the floating condition is more stable, compared to the case where it is controlled to the rotating condition in use at the beginning of rotation. Accordingly, in this case it is necessary to provide a bias means between the member provided with the permanent magnet 26 and the member provided with the superconducting body 27 so as to achieve a movement or displacement in the positional relationship between both members.

It will be noted that with the superconducting bearing unit of the present invention, a member provided with the shaft or bearing may be maintained in a floating condition without using a complicated control circuit.

In addition, according to the superconducting bearing unit of the present invention to maintain a member provided with either a shaft or bearing in a floating condition, at first before the superconducting body becomes superconducting, the position of either the shaft or member is controlled so that the magnet is as close as possible to the superconducting body on the side where the attractive force acts when in operation, and as wide a gap as possible is made on the side where the repulsive force acts in operation. In this condition, the superconducting body is made superconducting. Subsequently, the positional relationship is changed and at least an attractive force out of the attractive and the repulsive forces attributable to the pinning force is generated between the superconducting body and the magnet, so that the member provided with the shaft or bearing is maintained in the floating condition with its weight in balance with this force.

Figure 2A:
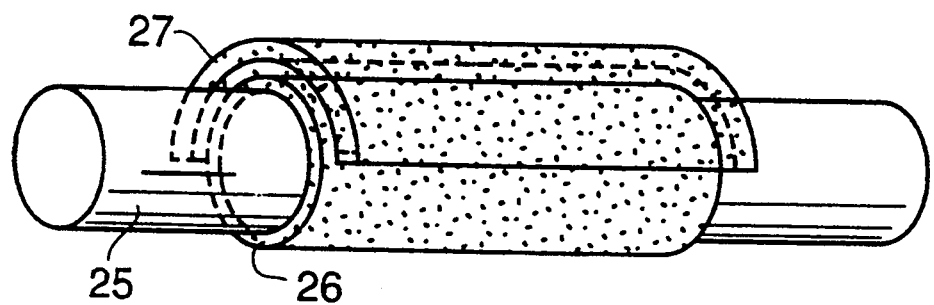
FIGS. 2(A) and (B) are respective perspective views illustrating a second embodiment of the present invention.

FIGS. 2(A) and (B) show a second embodiment of the present invention. It will be noted that with the first embodiment, the rotating shaft is disposed in a vertical direction with the superconducting body and permanent magnet disposed axially, while in contract, in this embodiment, the superconducting bearing section comprises a rotating shaft 25 disposed in a horizontal direction, with the superconducting body 27 and permanent magnet 26 arranged radial thereto.

As shown in FIG. 2(A), a semi-cylindrical superconducting body 27 is disposed radially above a permanent magnet 26 fixed to an outer periphery of the rotating shaft 25 in a central portion thereof. The superconducting body 27 is axially placed at the same position as the permanent magnet 26. The superconducting body 27 has a radius of curvature of a sufficient size so that a gap is formed in the radial direction between its inner surface and the outer peripheral surface of the permanent magnet 26.

With the superconducting bearing unit of the present invention constructed as above, the rotating shaft 25 is maintained in a floating condition through the following steps; at first before the superconducting body 27 becomes superconducting, the rotating shaft 25 is raised in the radial direction so that the outer peripheral surface of the permanent magnet 26 comes into contact with the inner peripheral surface of the superconducting body 27.

In this condition, the superconducting body 27 is cooled so as to become superconducting, and the force used to raise the rotating shaft 25 removed, so that the rotating shaft 25 and permanent magnet 26 tend to drop under their own weight. The rotating shaft 25 is then maintained in a floating condition at a position wherein the weight is in balance with the attractive force attributable to the pinning force.

Figure 2B:
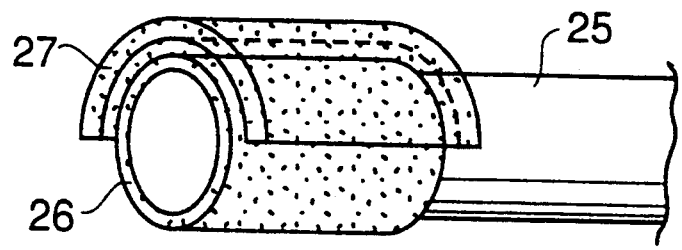

Now instead of having the permanent magnet 26 and superconducting body 27 disposed at a central position of the rotating body 25 as shown FIG. 2(A), they may be disposed at an end portion of the rotating shaft 25 as shown FIG. 2(B). In this case, placing a permanent magnet 26 and a superconducting body 27 at each end of the rotating shaft 25 (one end is omitted from FIG. 2(B)), may give an increase in stiffness or rigidity to oppose displacement forces of the rotating shaft 25. Alternatively, positioning them at one end only, may give an increase in the degree of freedom for locating other components on the rotating shaft 25. An arrangement with a combination of the constructions of FIG. 2(A) and (B) may also be possible. Furthermore as with the first embodiment, a rotor and so on having the superconducting body 27 may be made to rotate around a fixed axle.

Figure 3A:
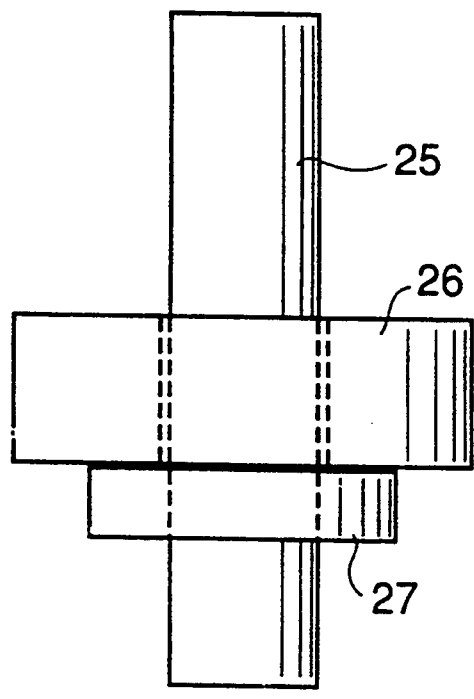
FIGS. 3(A) and (B) are schematic side views similar to FIG. 1 showing a third embodiment of the present invention.
Figure 3B:
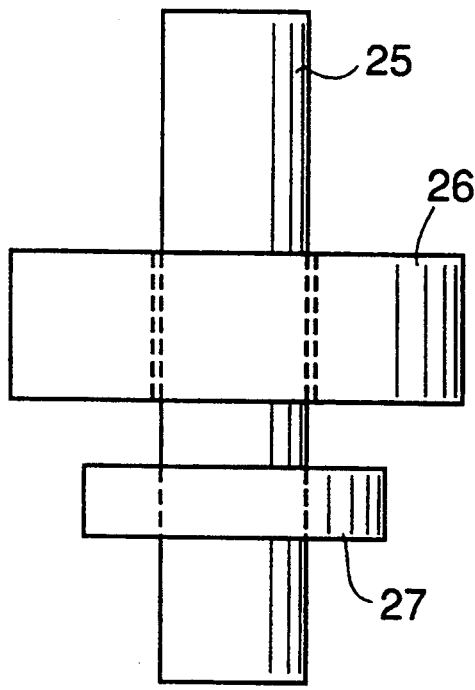

FIG. 3 shows a third embodiment of the present invention. In contrast to the first embodiment wherein the bearing has the superconducting body and the permanent magnet is fixed to the rotating shaft, in this embodiment the bearing has a permanent magnet 26, and the superconducting body 27 is fixed to the rotating shaft 25. In stead of the rotating shaft 25, any fixed axle may be used. When the superconducting body 27 is provided on a fixed axle, the cooling jacket for the superconducting body 27 may be provided inside the axle.

Figure 4:
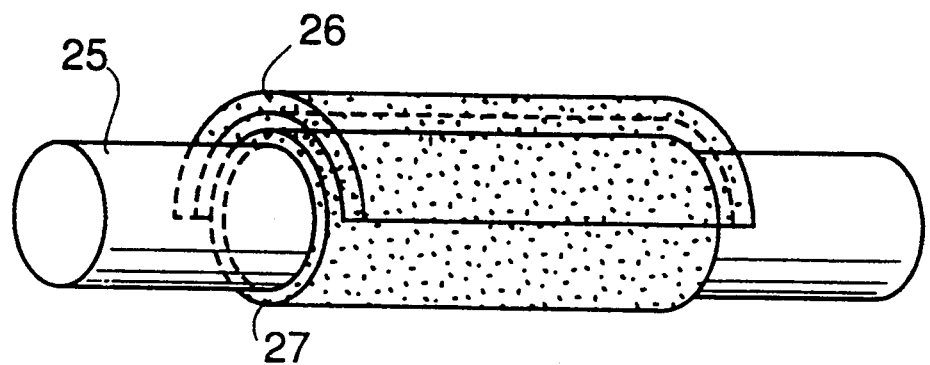
FIG. 4 is a perspective view showing a fourth embodiment of the present invention.

FIG. 4 shows a fourth embodiment of the present invention. In contrast to the second embodiment wherein the bearing has the superconducting body and the permanent magnet is fixed to the rotating shaft, in this embodiment the bearing has the permanent magnet 26, and the superconducting body 27 is fixed to the rotating shaft 25. As with the second embodiment, the permanent magnet 26 and superconducting body 27 may be disposed on the end portion of the rotating shaft 25.

Figure 5:
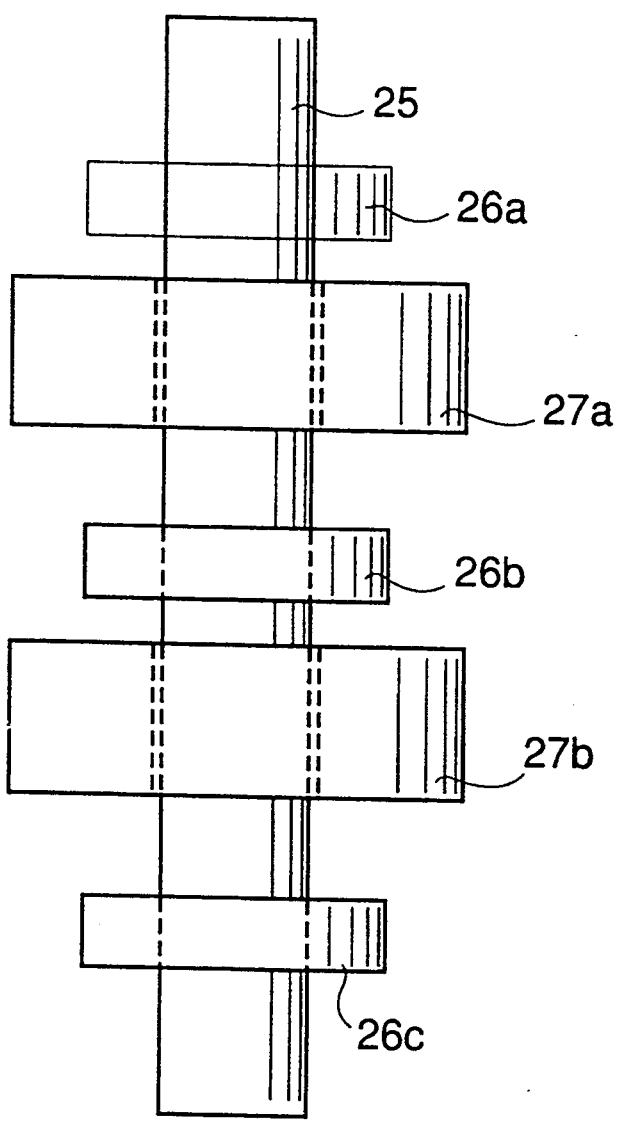
FIG. 5 is a schematic side view showing a fifth embodiment of the present invention.

FIG. 5 shows a fifth embodiment of the present invention. A plurality of permanent magnets 26a, 26b and 26c are fixedly supported at mutually spaced intervals on the outer periphery of the vertically extending rotating shaft 25. A cylindrical superconducting body 27a is provided between the permanent magnets 26a and 26b, and a cylindrical superconducting body 27b is between the permanent magnet 26b and 26c, with the rotating shaft 25 passing therethrough, and are fixedly supported on an inner peripheral wall of the housing, so that the respective members 26a, 26b, 26c, and 27a, 27b make up a superconducting bearing section. Furthermore, a cooling jacket is provided inside the housing at a portion in contact with the superconducting bodies 27a and 27b.

With the above construction of the superconducting bearing unit of present invention, the rotating shaft is maintained in a floating condition by the following steps; at first the rotating shaft 25 is raised so that the permanent magnets 26b and 26c fixed to the rotating shaft 25 are positioned as close as possible to the superconducting bodies 27a and 27b.

Then in this condition, the respective superconducting bodies 27a and 27b are cooled to become superconducting. The force holding up the rotating shaft 25 is then removed, so that the rotating shaft 25 and permanent magnets 26a, 26b and 26c tend to fall under their own weight until the rotating shaft 25 is maintained in a floating condition at a position where the combined weight is balanced by the attractive and repulsive forces attributable to the pinning force.

In this case, a repulsive force acts between the lower face of the permanent magnet 26a and the upper face of the superconducting body 27a, an attractive force acts between the upper face of the permanent magnet 26b and the lower face of the superconducting body 27a, a repulsive force acts between the lower face of the permanent magnet 26b and the upper face of the superconducting body 27b, and an attractive force acts between the upper face of the permanent magnet 26c and the lower face of the superconducting body 27b. Due to these forces, the rotating shaft 25 is maintained in a floating condition at a position wherein the forces are in equilibrium with the combined weights on the rotating shaft. Furthermore, as with the previously mentioned embodiments, it may also be possible for a member such as a rotor on which the super conducting bodies 27a, 27b are mounted, to rotate around an axle provided therethrough.

Figure 6:
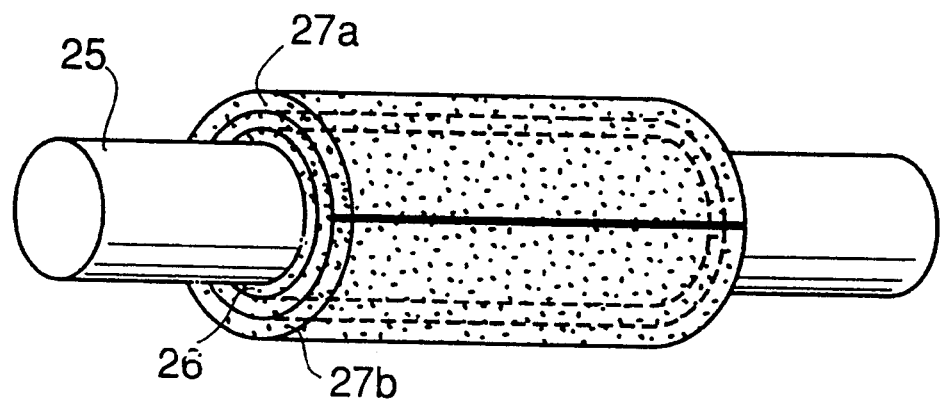
FIG. 6 is a perspective view showing a sixth embodiment of the present invention.

FIG. 6 shows a sixth embodiment of the present invention. In contrast to the fifth embodiment wherein the rotating shaft is arranged vertically, and the superconducting body and permanent magnets are arranged in the axial direction, in this sixth embodiment, the rotating shaft 25 is disposed in a horizontal direction and respective semi-cylindrically shaped superconducting bodies 27a and 27b are radially disposed with respect to the cylindrical permanent magnet 26.

With the superconducting bearing unit of the sixth embodiment constructed as above, the rotating shaft 25 is raised upwards in a radial direction prior to the superconducting bodies 27a and 27b becoming superconducting. The superconducting bodies 27a and 27b are then cooled to become superconducting. Subsequently, the force holding radially up the rotating shaft 25 is removed.

In this condition, the rotating shaft 25 tends to drop under its own weight, so that attractive forces and repulsive forces attributable to the pinning force are generated between the permanent magnet 26 and superconducting body 27a, and between the permanent magnet 26 and the superconducting body 27b respectively. The rotating shaft 26 is then supported in a floating condition at a position wherein the attractive and repulsive forces are in equilibrium with its weight.

With this embodiment, the superconducting bodies 27a and 27b are formed in a semi-cylindrical shape, that is two halves. However it may also be possible to have a single cylindrical superconducting body having an inner diameter greater that the outer diameter of the permanent magnet 26. Furthermore, as with the previous embodiment, a member such as rotor on which the superconducting bodies 27a and 27b are disposed may be rotatable about a fixed axle, and as with the second and fourth embodiments, the permanent magnet 26 and superconducting bodies 27a, 27b may be provided at the end portion of the rotating shaft 25.

Figure 7:
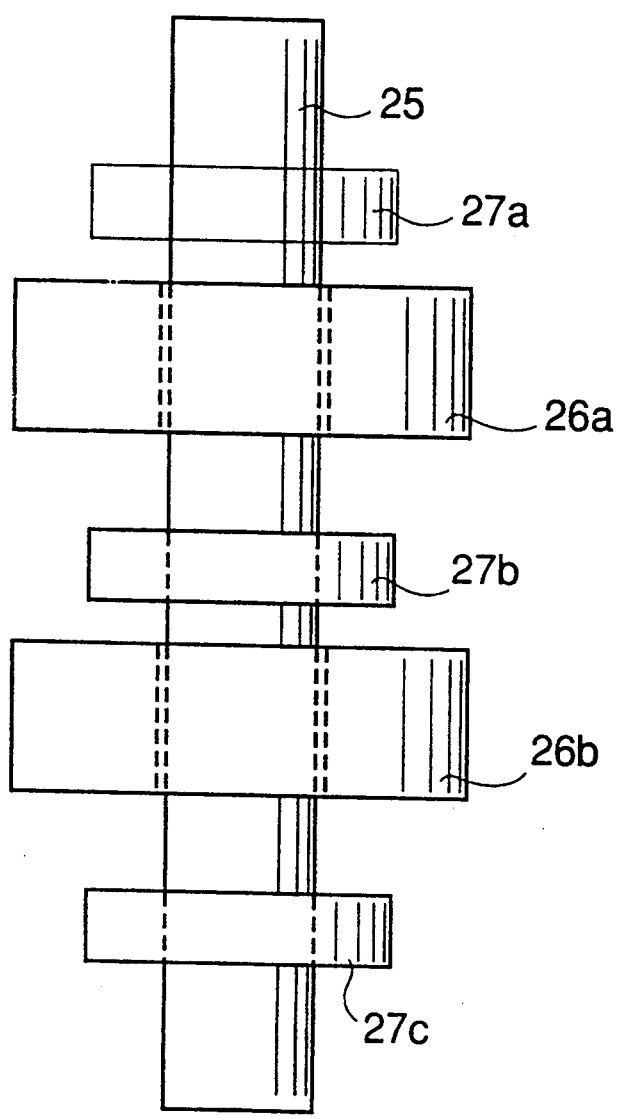
FIG. 7 is a schematic side view showing a seventh embodiment of the present invention.

FIG. 7 shows a seventh embodiment of the present invention. In contrast to the fifth embodiment wherein the bearing has the super conducting body, and the permanent magnet is fixed to the rotating shaft, in this embodiment the bearing has the permanent magnets 26a and 26b and the superconducting bodies 27a, 27b and 27c are fixed to the rotating shaft 25. Furthermore, as with the previously mentioned embodiment, a member such as rotor with the permanent magnets 26a and 26b disposed thereon may be freely rotatable about the axle.

Figure 8:
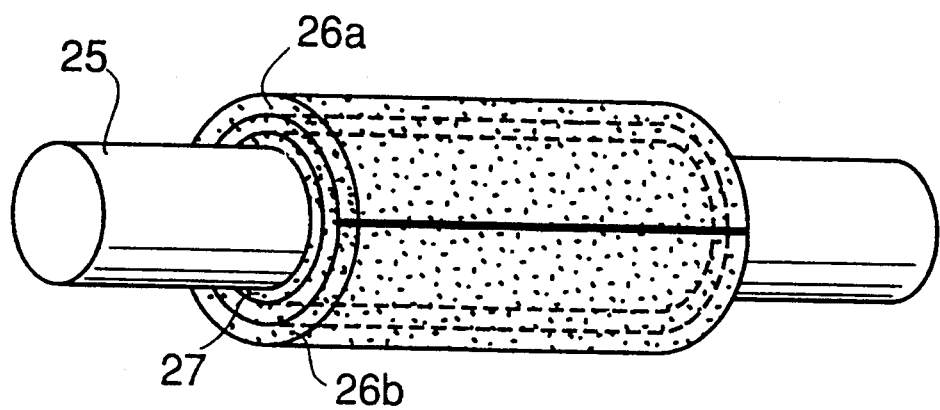
FIG. 8 is a perspective view showing an eighth embodiment of the present invention.

FIG. 8 shows an eighth embodiment of the present invention. In contrast to the sixth embodiment wherein the bearing has the superconducting body, and the permanent magnet is fixed to the rotating shaft, in this eighth embodiment, the bearing has the permanent magnets 26a and 26b and the superconducting body 27 is fixed to the rotating shaft 25. With this embodiment, as with the previously mentioned embodiment, it is also possible for a member such as a rotor with the permanent magnet 26a and 26b disposed thereon to rotate about a fixed axle. In addition, as with the second, fourth and sixth embodiments, the permanent magnets 26a and 26b, and super conducting bodies 27 may be provided at the end portion of the rotating shaft 25. Furthermore, the permanent magnet may be formed in a single cylindrical shape.

Figure 9:
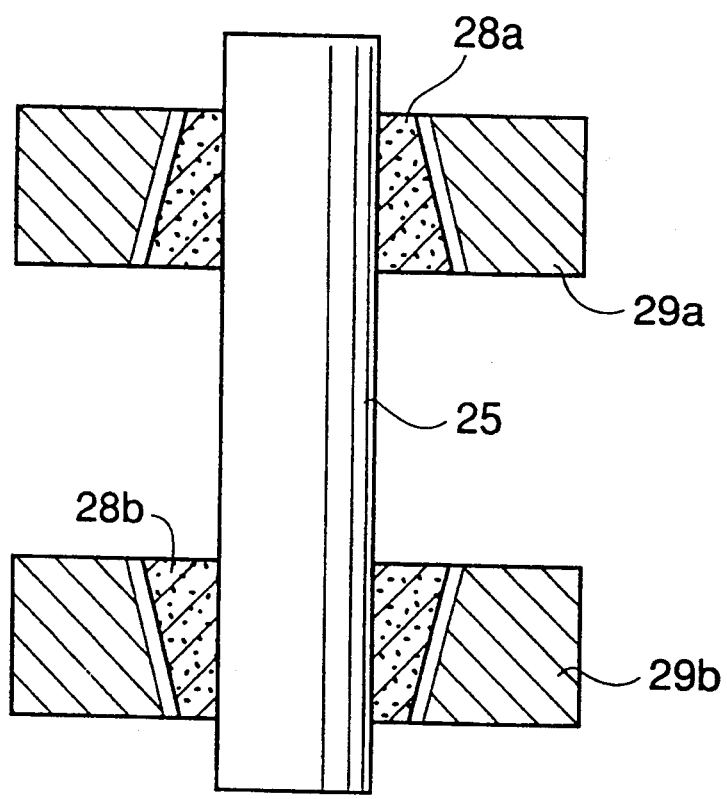
FIG. 9 is a schematic side view showing a ninth embodiment of the present invention.

FIG. 9 shows a ninth embodiment of the present invention. In this embodiment, the superconducting bearing section comprises permanent magnets 28a and 28b fixed at respective upper and lower positions on the rotating shaft 25, and superconducting bodies 29a and 29b fixed at two positions on upper and lower internal peripheral surfaces of the housing, so that the inner peripheral faces of the superconducting bodies 29a and 29b oppose the outer peripheral faces of the permanent magnets 28a and 28b. The outer peripheral faces of the permanent magnets 28a and 28b are formed in conical outer or convex surfaces while the inner peripheral surfaces of the respective superconducting bodies 29a and 29b are formed in conical inner or concave surfaces. The conical outer surfaces of the permanent magnets 28a and 28b and the conical inner surfaces of the superconducting bodies 29a and 29b are arranged so as to mutually oppose each other with a gap therebetween.

As a result, with this embodiment, the rotating shaft 25 may be supported with a sufficiently large radial force as well as being supported in an axial direction (thrust direction) by means of the attractive and repulsive forces attributable to the pinning force acting between the respective permanent magnets 28a and 28b and the superconducting bodies 29a and 29b. Furthermore, with this embodiment, as with the previous embodiment, as member such as rotor with the superconducting bodies 29a and 29b disposed thereon may be rotated about a fixed axle, and as with the second, fourth, sixth and eight embodiments, the permanent magnets 28a and 28b and the superconducting bodies 29a and 29b may be provided at an end portion of the rotating shaft 25.

Figure 10:
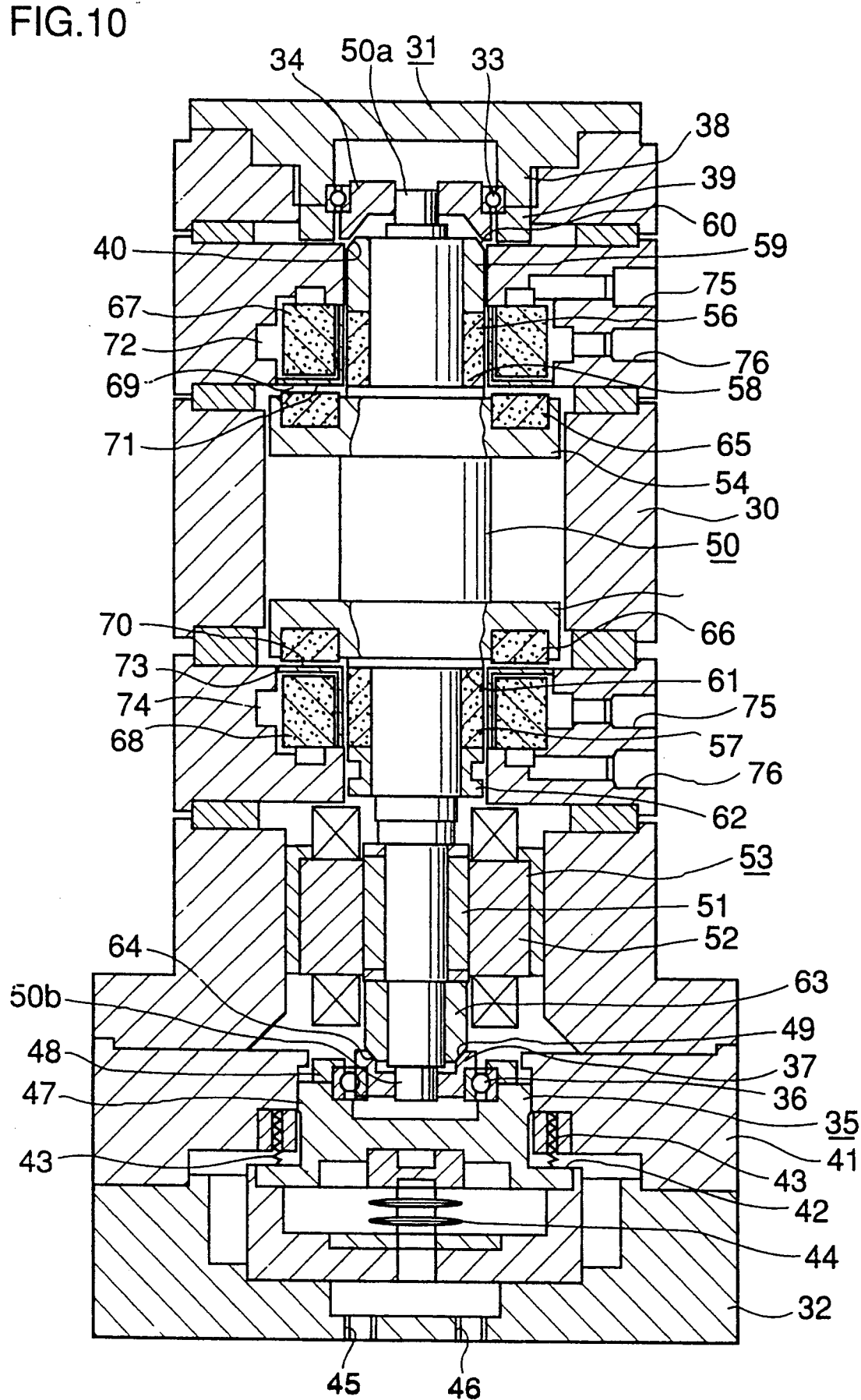
FIG. 10 is a vertical sectional view showing a tenth embodiment in an operational condition of the present invention.
Figure 11:
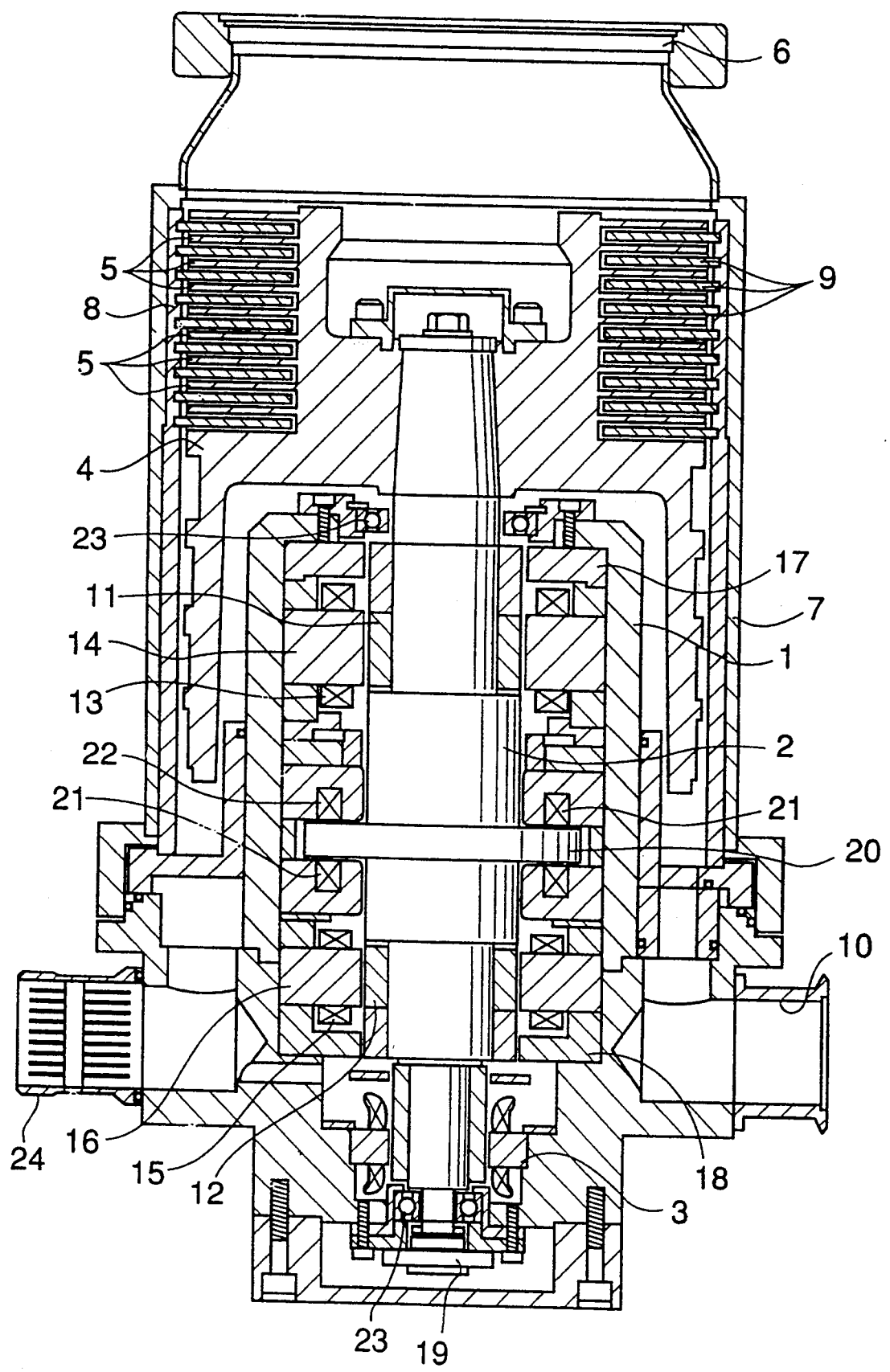
FIG. 11 is a vertical sectional view showing a turbo molecular pump of a conventional construction.

FIG. 10 shows one example of an actual construction for a superconducting bearing unit, being a tenth embodiment of the present invention. The respective openings at upper and lower ends of a vertical cylindrical housing 30 are closed by an upper cover 31 and a lower cover 32.

An upper support ring 34 is supported by means of a radial bearing 33 at a lower central portion of the upper cover 31, while a support block 35 is provided on an upper cylindrical central portion of the lower cover 32 so as to be freely movable up and down. The lower support ring 37 is supported at an upper central portion of the support block 35 by means of a radial bearing 36.

In this construction, a cylindrical or annular portion 38 is formed at a central portion on the lower face of the upper cover 31, such that the outer ring of the radial bearing 33 is clampingly fixed between the cylindrical portion 38 and a retaining ring 39 fixed to the lower face of the cylindrical portion 38. Furthermore, fixedly fitted into the inner ring of the radial bearing 33 is an upper support ring 34 the lower opening rim of which is formed with an upper conical inner face 40 having an inner diameter increasing downwards.

The support block 35 is fitted so as to be freely movable up and down inside a cylindrically shaped support ring 41 which is clampingly held between the upper face of the lower cover 32 and the lower face of the housing 30. Compression springs 43 are provided between an inner peripheral portion on the lower face of the support ring 41 and an upper face of a flange 42 formed around an outer periphery of the support block 35. The compression springs 43 exert a downwards force on the support block 35.

Furthermore, a bellows 44 is provided between the upper central face of the lower cover 32 and a central portion on the lower face of the support block 35. And a supply port 45 and a discharge port 46 are provided in the lower cover 32. By supplying and discharging compressed air to and from the bellows 44 by way of the supply port 45 and the discharge port 46, the support block 35 may be raised and lowered freely.

A cylindrical or annular portion 47 is formed on an outer peripheral portion of the upper surface of the support block 35. The outer ring of the radial bearing 36 is clampingly fixed between the cylindrical portion 47 and a retaining ring 48 fixed to the upper face of the cylindrical portion 47. Fixedly fitted into the inner ring of the radial bearing 36 is a lower support ring 37 which is provided with a lower conical inner face 49 formed on the upper opening rim thereof. The lower conical inner face 49 has an inner diameter increasing in an upward direction.

A rotating shaft is seen to have small diameter portions 50a and 50b formed on respective upper and lower ends of the rotating shaft 50 and fit loosely into apertures in the upper support ring 34 and lower support ring 37. An electric motor 53 for rotating the rotating shaft 50 comprises a rotor 51 fixedly attached to a lower portion of the rotating shaft 50 on its outer phersphery, and a stator 52 fitted in a lower inner peripheral face of the housing 30 so as to oppose the outer periphery of the rotor 51.

An upper flange 54 and lower flange 55 are formed at respective upper and lower locations on the outer periphery of the rotating shaft 50. A ring-shaped upper permanent magnet 56 for radial bearing is fixedly fitted on an outer peripheral portion of the rotating shaft 50 above the upper flange 54, and a ring-shaped lower permanent magnet 57 for radial bearing is fixedly fitted on an outer peripheral portion of the rotating shaft 50 below the lower flange 55.

With this construction, the upper permanent magnet 56 for radial bearing is fitted onto an upper portion of the rotating shaft 50 and is clampingly held between the upper face of a step portion 58 formed on the outer periphery of the rotating shaft 50 and the lower face of a retaining ring 59 fixedly fitted around the upper end portion of the rotating shaft 50. An upper conical outer or convex face 60 is formed on the upper peripheral rim of the retaining ring 59, such that when the rotating shaft 50 is raised, the upper conical outer or convex face 60 fits closely into the upper conical inner face 40 of the support ring 34.

The lower permanent magnet 57 for radial bearing is clampingly held at a central portion of the rotating shaft 50 between a step portion 61 and a retaining ring 62. A retaining ring 63 for securing the rotor 51 of the electric motor 53 is fixedly fitted to the lower end of the rotating shaft 50. A lower conical outer or convex face 64 is formed on an outer peripheral rim section at the lower end of the retaining ring 63, so that when the support block 35 is raised, the lower conical outer or convex face 64 fits accurately into the lower conical inner or concave face 49 of the lower support ring 37.

An upper permanent magnet 65 for thrust bearing is fixedly fitted into the upper face of the upper flange 54, and a permanent magnet 66 for the lower thrust bearing is fixedly fitted into the lower face of the lower flange 55.

Cylindrical upper and lower superconducting bodies 67 and 68 are fixedly supported at respective upper and lower locations on the inner periphery of the housing 30 respectively. An upper superconducting radial bearing section is formed with a radial bearing gap between the inner peripheral face of the upper superconducting body 67 and the outer peripheral face of the upper permanent magnet 56 for radial bearing, and an upper superconducting thrust bearing section is formed with an upper thrust bearing gap 69 between the lower face of the upper superconducting body 67 and the upper face of the upper permanent magnet 65 for thrust bearing. Similarly, a lower superconducting radial bearing section is formed with a lower radial bearing gap between the inner peripheral face of the lower superconducting body 68 and the outer peripheral face of the lower permanent magnet 57 for radial bearing, and a lower superconducting thrust bearing section is formed with a lower thrust bearing gap 70 between the upper face of the superconducting body 68 and the lower face of the lower permanent magnet 66 for thrust bearing.

An upper shroud in a shape of cylindrical thin plate 71 having an L-shape in cross section is provided on the upper inner peripheral face of the housing 30 so as to cover the inner peripheral face as well as the lower face of the upper superconducting body 67. The upper shroud 71 and the housing 30 define an annular volume portion for an upper cooling jacket 72 for cooling the upper superconducting body 67. Similarly, a lower shroud in a shape of cylindrical thin plate 73 having an L-shape in cross section is provided at the lower inner peripheral face of the housing 30 so as to enclose the inner peripheral face as well as the upper face of the lower superconducting body 68. The lower shroud 73 and the housing 30 define an annular volume portion for a lower cooling jacket 74.

The outer peripheral face of the upper permanent magnet 56 for radial bearing opposes the inner peripheral face of the upper shroud 71 with a small gap therebetween, and the upper face of the upper permanent magnet 65 for thrust bearing opposes the lower face of the upper shroud 71 with a small gap therebetween. Similarly, the outer peripheral face of the lower permanent magnet 57 for radial bearing opposes the inner peripheral face of the lower shroud 73 with a small gap therebetween, and the lower face of the lower permanent magnet 66 for thrust bearing opposes the upper face of the lower shroud 73 with a small gap therebetween.

The upper and lower cooling jackets 72 and 74 are provided with respective inlet ports 75 and outlet ports 76 whereby cooling agent such as liquid nitrogen or liquid helium may be freely supplied to the respective cooling jackets 72 and 74. Furthermore, the cooling agent such as liquid nitrogen is able to come in contact with the respective superconducting bodies 67 and 68 at clearances formed between the respective shrouds 71 and 73 and the surfaces of the superconducting bodies 67, 68, except for the portion where the outer faces of the superconducting bodies 67 and 68 are in contact with the housing 30. In this way, a large temperature gradient in the superconducting bodies 67 and 68 is prevented from occuring and this also prevents deterioration the superconducting bodies 67 and 68 in the case where they are oxide superconducting bodies. With this construction, the respective upper and lower shrouds 71 and 73 are preferably made of an austenitic stainless steel sheet of 0.3 to 0.5 mm in thickness.

With the superconducting bearing unit of the present invention constructed as above, the procedure whereby the rotating shaft 50 is maintained in a floating condition is carried out as follows. At first, before supplying cooling agent such as liquid nitrogen to the upper and lower cooling jackets 72 and 74 to cool them to a superconducting condition, compressed air is supplied to the interior of the bellows 44 by way of the supply port 45, so that the support block 35 is raised.

As a result, the lower conical inner or concave surface 49 of the lower support ring 37 is urgingly engaged with the lower outer or convex conial surface 64 of the retaining ring 63 provided on the lower portion of the rotating shaft 50, so that the lower portion of the rotating shaft 50 is concentrically aligned within the housing 30 while rotating shaft 50 being raised.

Consequently, the upper conical outer or convex face 60 on the upper rim section of the retaining ring 59 is urgingly engaged with the upper conical inner or concave face 40 of the upper support ring 34, so that the upper end of the rotating shaft 50 is concentrically aligned within the housing 30.

As a result, the respective upper and lower pair of permanent magnets 56 and 57 for radial bearing are held concentric with the respective upper and lower pair of superconducting bodies 67 and 68.

Furthermore, as a result of raising the rotating shaft 50 by means of the support block 35, the respective upper and lower thrust bearing gaps 69 and 70 change a little from the operating gap shown in FIG. 10. This change depends on the size of the superconducting bodies 67 and 68 and the weight of the rotating shaft 50.

In this condition, cooling agent such as liquid nitrogen is supplied to the upper and lower cooling jackets 72 and 74 so that the upper and lower superconducting bodies 67 and 68 become superconducting. Then the compressed air in the bellows 44 is discharged through the discharge port 46, and the support block 35 lowers under the urging or biasing force of the compression springs 43.

Consequently, the force of the lower support ring 37 on the upper face of the support block 35 to support the rotating shaft 50 is lost. However, the rotating shaft 50 remains supported by means of the force attributable to the pinning force acting between the respective upper and lower superconducting bodies 67 and 68 and the respective upper and lower permanent magnets 56 and 57 for radial bearing and the upper and lower permanent magnets 65 and 66 for thrust bearing. Specifically, with lowering of the support block 35, the rotating shaft 50 together with the members fixed thereto tends to fall under the weight thereof, so that the upper thrust bearing gap 69 tends to increase and the lower thrust bearing gap 70 tends to decrease. This is counter-balanced by the pinning force mentioned above.

Since a balance may be maintained between the weight of the rotating members and the pinning force between the upper and lower permanent magnets 65 and 66 for thrust bearing and upper and lower superconducting bodies 67 and 68 which tends to raise the rotating shaft 50, the rotating shaft 50 may be maintained in a floating condition by appropriate selection of the weight of the rotating shaft and members, and the magnitude of the force attributable to the pinning force.

Furthermore, the gap between the outer peripheral face of the upper permanent magnet 56 for radial bearing and the inner peripheral face of the upper superconducting body 67, and the gap between the outer peripheral face of the lower permanent magnet 57 for radial bearing and the inner peripheral face of the lower superconducting body 68 is held as in a state before the support block 35 has been lowered. This is made by the action of the attractive and repulsive forces between the respective upper and lower permanent magnets 56 and 57 for radial bearing and super conducting bodies 67 and 68. Consequently, the rotating shaft 50 is prevented from displacing in a radial direction.

In this way, the rotating shaft 50 is positionally located by means of the attractive and repulsive forces attributable to the pinning force of the superconducting bodies. Since this is achieved automatically, the rotating shaft 50 may be maintained in a floating condition without the need for complicated control circuits. Specifically sensors for detecting the position of the rotating shaft 50 in the radial and thrust directions together with the associated electromagnets and controllers become unnecessary.

Consequently, the rotating shaft 50 may be rotated at a very high speed in a non-contact condition when power is supplied to the stator 52 while cooling agent such as liquid nitrogen is supplied to the respective cooling jackets 72 and 74.

With the present invention, various types of conducting materials having a pinning effect may be used for the superconducting body of the superconducting bearing unit. For example, a large pinning force can be obtained with Yttrium compounds made from a uniform mixture of finely powdered $Y_2BaCuOn$ of a non conducting phase referred to as 211 phase mixed with a superconducting phase of $YBa_2Cu_3On$ generally referred to as 123 phase.

It should be noted that, by using the attractive force, or both the attractive and repulsive forces due to the pinning effect as in the present invention, a rotating shaft 50 of approximately 2.4 kg or larger (depending on the size of the forces) can be supported and be rotated at a super high speed of approximately 30,000 rpm. With the example shown in FIG. 10, if the superconducting bearing units having upper and lower thrust bearing section were constructed to utilize only the repulsive force at the temperature of liquid nitrogen due to the Meissner effect to support the rotating shaft 50, a rotating shaft 50 of only a few grams could be supported.

With superconducting bodies, the repulsive force due to the pinning effect is much larger than the repulsive force due to the Meissner effect. Furthermore, the attractive force is better than the repulsive force. Specifically with a bearing unit utilizing only this repulsive force, there is a limit to the arrangement of components. That is to say, in order to obtain the maximum repulsive force, the distance between the magnet and the superconducting body should ideally be set at infinity prior to cooling the superconducting body and then bringing the magnet and superconducting body close together. However, it is not possible to set the distance between the magnet and superconducting body at infinity, and in this respect the arrangement of components is limited. On the other hand, with a small distance in order to improve the arrangement of components, it is not possible to obtain sufficient load bearing capacity.

In contrast, with a super conducting bearing unit utilizing the attractive force, it is possible to obtain a superconducting bearing unit of optimum construction since a maximum attractive force can be obtained when the superconducting body is cooled in contact with the permanent magnet and becomes superconducting.

With the tenth embodiment, when the rotating shaft 50 is concentrically aligned in the housing 30, the gaps existing between the outer periphery of the upper and lower small diameter portions 50a, 50b and the inner peripheral faces of the upper and lower support rings 34 and 37 are smaller than the gaps between the outer peripheral surfaces of the upper and lower permanent magnets 56 and 57 for radial bearing and the inner peripheral surfaces of the upper and lower shrouds 71 and 73. Consequently, when the supporting force due to the superconducting bearing unit is lost, the outer peripheral faces of the small diameter portions 50a and 50b come into contact with the inner peripheral faces of the respective support rings 34 and 37 so as to prevent contact between the outer peripheral faces of the respective permanen magnets 56 and 57 and the inner peripheral faces of the respective shrouds 71 and 73.

In the superconducting bearing unit of the present invention and operating method therefor as mentioned hereonbefore, since the arrangement is such that at least the attractive force of the forces attributable to the pinning force of the superconducting body is utilized, it is possible to restrict and maintain the accumulated load of components such as the rotating shaft or rotor etc. in a floating condition, so that super high speeds above several tens of thousand rpm can be achieved. Furthermore, high cost sensors and complicated control circuits are not necessary, while low cost small size construction is possible. Accordingly, the present invention provides a superconducting bearing unit with practical applications in a wide field of technology.

Since certain changes may be made in the above system and method without departing from the scope of the invention herein involved, it is intended that all matter contained in the above description or shown in the accompanying drawings shall be interpreted as inllustrative and not in a limiting sense.

We claim:

1. A superconducting bearing unit comprising a housing having an inner peripheral surface, a superconducting body secured to the inner peripheral surface of the housing, a shaft extending within the housing and having an axis and two convex faces spaced apart from each other in the direction of said axis, and a flange section, magnet means secured to the shaft between the spaced-apart convex faces thereof, the magnet means comprising first magnet means secured to the shaft, second magnet means secured to the flange section of the shaft, the superconducting body cooperating with the first and second magnet means to form a superconducting bearing section to produce forces including an attractive force, the superconducting body being of an annular shape and having an inner peripheral surface and an end face, the first magnet means being of an annular shape and being provided for radial bearing, the second magnet means being of an annular shape and being provided for thrust bearing, the inner peripheral surface of the superconducting body being radially opposed to the first magnet means for radial bearing, and the end face of the superconducting body being opposed to the second magnet means in the direction of said axis for thrust bearing, support rings supported in the housing and each being formed with a concave face, concave faces of said support rings cooperating with the convex faces of said shaft, respectively, so as to be tightly engaged therewith such that when the convex faces of the shaft are tightly engaged with the respective concave faces, the superconducting bearing section is coaxial with the shaft.

2. A superconducting bearing unit comprising a housing having an inner peripheral surface, a plurality of superconducting bodies secured to the inner peripheral surface of the housing, a shaft extending within the housing and having an axis and two convex faces spaced apart from each other in the direction of said axis, and a plurality of flange sections, magnet means secured to the shaft between the spaced-apart convex faces thereof, the magnet means comprising a plurality of first magnets secured to the shaft, and a plurality of second magnets secured to the flange sections of the shaft, the superconducting bodies cooperating with the pluralities of first and second magnets to form a plurality of superconduct-ing bearing sections to produce forces for supporting a load, said forces including an attractive force which is produced in one of the superconducting bearing sections and a repulsive force which is produced in another of the superconducting bearing sections, the superconducting bodies each being of an annular shape and having an inner peripheral surface and an end face, the first magnets each being of an annular shape and provided for radial bearing, the second magnets each being of an annular shape and provided for thrust bearing, the inner peripheral surfaces of the superconducting bodies being radially opposed to the first magnets, respectively, for radial bearing, and the end faces of the superconducting bodies being opposed to the second magnets, respectively, in the direction of said axis, for thrust bearing, support rings supported in the housing and each being formed with a concave face, concave faces of said support rings cooperating with the convex faces of the shaft so as to be tightly engaged therewith such that when the convex faces are tightly engaged with the respective concave faces, the superconducting bearing sections are coaxial with the shaft.

3. A method of operating a superconducting bearing unit including a housing having an inner peripheral surface, a superconducting body secured to the inner peripheral surface of the housing, a shaft extending within the housing, magnet means secured to the shaft, wherein the superconducting body cooperates with the magnet means to form a superconducting bearing section, the method comprising the steps of:

maintaining the superconducting bearing section coaxial with the shaft with the superconducting body placed in a non-superconducting state, cooling the superconducting body to a superconducting state with the superconducting bearing section maintained coaxial with the shaft, and axially shifting one of the magnet means and the superconducting body with reference to another of the magnet means and the superconducting body, whereby an attractive force is produced due to pinning effect between the superconducting body and the magnet means.

4. The method of claim 3, wherein a repulsive force is produced due to pinning effect between the superconducting body and the magnet means.

* * * * *

UNITED STATES PATENT AND TRADEMARK OFFICE
CERTIFICATE OF CORRECTION

PATENT NO.   : 5,341,059
DATED        : August 23, 1994
INVENTOR(S)  : Fukuyama et al.

It is certified that error appears in the above-identified patent and that said Letters Patent is hereby corrected as shown below:

On the cover page:

add the following;

--NSK, Ltd. of Tokyo, Japan--

Signed and Sealed this

Thirty-first Day of January, 1995

Attest:

BRUCE LEHMAN

Attesting Officer

Commissioner of Patents and Trademarks